US011207837B2

(12) United States Patent
Hümmeler et al.

(10) Patent No.: US 11,207,837 B2
(45) Date of Patent: Dec. 28, 2021

(54) METHOD AND CONTROL COMMAND GENERATING UNIT FOR AN AUTOMATIC GENERATION OF CONTROL COMMANDS OF AN ADDITIVE LAYER-WISE BUILDING DEVICE

(71) Applicant: EOS GmbH Electro Optical Systems, Krailling (DE)

(72) Inventors: Ludger Hümmeler, Lennestadt (DE); Manfred Semmler, Memmingen (DE); Siegfried Mayer, Kolbermoor (DE); Markus Frohnmaier, Hengersberg (DE)

(73) Assignee: EOS GmbH Electro Optical Systems, Krailling (DE)

( * ) Notice: Subject to any disclaimer, the term of this patent is extended or adjusted under 35 U.S.C. 154(b) by 653 days.

(21) Appl. No.: 15/567,146

(22) PCT Filed: Apr. 15, 2016

(86) PCT No.: PCT/EP2016/058439
§ 371 (c)(1),
(2) Date: Oct. 17, 2017

(87) PCT Pub. No.: WO2016/166337
PCT Pub. Date: Oct. 20, 2016

(65) Prior Publication Data
US 2018/0099454 A1    Apr. 12, 2018

(30) Foreign Application Priority Data

Apr. 17, 2015   (DE) .......................... 102015004924

(51) Int. Cl.
*B29C 64/393*      (2017.01)
*B33Y 30/00*       (2015.01)
(Continued)

(52) U.S. Cl.
CPC ............ *B29C 64/393* (2017.08); *B22F 10/30* (2021.01); *B28B 1/001* (2013.01);
(Continued)

(58) Field of Classification Search
None
See application file for complete search history.

(56) References Cited

U.S. PATENT DOCUMENTS 5,730,925 A    3/1998   Mattes et al.
5,819,388 A *  10/1998  Salm ................. G05B 19/4099
                                                  29/424

(Continued)

FOREIGN PATENT DOCUMENTS

CN    101109898    1/2008
CN    104260356    1/2015
(Continued)

OTHER PUBLICATIONS

Onuh et al., Journal of Intellilgent Manufacturing, Rapid Prototyping Technology: Applications and Benefits for Rapid Product Development, 1999, pp. 301-311 (11 pages).
(Continued)

*Primary Examiner* — Sean Shechtman
(74) *Attorney, Agent, or Firm* — Seyfarth Shaw LLP

(57) ABSTRACT

A method for providing control commands for producing a number of three-dimensional objects by an additive layer-wise building device. The method can include a step of providing a computer-based model of the number of objects that geometrically describes the objects, a step of modifying the computer-based model such that for the geometric description of the number of objects a location is defined as a common origin of coordinates, and a step of generating control commands for a set of control commands for controlling the production of the number of objects by the
(Continued)

additive layer-wise building device on the basis of the modified computer-based model.

18 Claims, 4 Drawing Sheets

(51) Int. Cl.
*B33Y 50/02* (2015.01)
*B29C 64/153* (2017.01)
*B22F 10/30* (2021.01)
*B33Y 10/00* (2015.01)
*B29C 64/165* (2017.01)
*B28B 1/00* (2006.01)
*B28B 17/00* (2006.01)
*B22F 10/10* (2021.01)

(52) U.S. Cl.
CPC ........ *B28B 17/0081* (2013.01); *B29C 64/153* (2017.08); *B29C 64/165* (2017.08); *B33Y 10/00* (2014.12); *B33Y 30/00* (2014.12); *B33Y 50/02* (2014.12); *B22F 10/10* (2021.01)

(56) References Cited

U.S. PATENT DOCUMENTS

| | | | |
|---|---|---|---|
| 6,280,785 | B1 | 8/2001 | Yang Junsheng et al. |
| 2013/0041629 | A1* | 2/2013 | Fisker ................ A61C 13/0004 |
| | | | 703/1 |

FOREIGN PATENT DOCUMENTS

| | | |
|---|---|---|
| CN | 104385590 | 3/2015 |
| CN | 104390127 | 3/2015 |
| DE | 19514740 | 4/1996 |
| EP | 1880830 | 1/2008 |
| WO | 2011100978 | 8/2011 |
| WO | 2012021816 | 2/2012 |

OTHER PUBLICATIONS

Mingareev et al., Proc. of Spie, Post-processing of 3D-printed Parts Using Femtosecond and Picosecond Laser Radiation, 2014, pp. 89700R-1-89700R-7 (7 pages).

* cited by examiner

METHOD AND CONTROL COMMAND GENERATING UNIT FOR AN AUTOMATIC GENERATION OF CONTROL COMMANDS OF AN ADDITIVE LAYER-WISE BUILDING DEVICE

TECHNICAL FIELD OF THE INVENTION

The invention refers to a method and a device for providing control commands for the production of a number of three-dimensional objects by means of an additive layer-wise building device. Furthermore, the invention relates to a method and a device for producing the number of three-dimensional objects using the provided control commands.

BACKGROUND OF THE INVENTION

Additive layer-wise building methods (also called generative layer-wise building methods), such as laser sintering or laser melting or stereolithography, are characterized in that objects to be produced are produced layer by layer from a building material in powder form or a liquid building material by means of producing in each layer the cross-sections of the objects in said layer by solidifying the building material. For the production, the presence of a computer-based three-dimensional representation of the objects is required, which can be produced, for example, by means of a CAD design program.

Normally, the building process takes place in a build chamber arranged within the additive layer-wise building device, from which the objects are removed after completion of the building process. For an efficient utilization of the build chamber an arrangement as compact as possible of the objects to be produced in the build chamber is desirable. Preferably, related objects should be arranged adjacent to each other in the build chamber. For the arrangement not having to be carried out in a complex manner by a person, WO 2011/100978 A1 proposes an automated method for an arrangement.

In the production of the objects, first a production true to scale according to the computer-based three-dimensional representation of the objects is aimed for. However, due to the building process there may be deviations in size. On the one hand, there can be an enlargement of dimensions of the object as a result of the building material surrounding an object fusing with the object, on the other hand, changes in temperature during the building process can lead to a distortion and a shrinkage can occur as a result of the solidification process. Such dimensional deviations could be considered in advance by an adjustment of the computer-based three-dimensional representation of an object, but for a plurality of objects this leads to problems in the build chamber since the relative position of the objects with respect to each other changes.

SUMMARY OF THE INVENTION

It is therefore an object of the present invention to provide a method and a device by means of which dimensional changes of objects resulting from the building process can be taken into account without strongly impairing the building process or the relative position of the objects with respect to each other.

The object is achieved by a method for providing control commands according to claim 1, a device for providing control commands according to claim 13, a method for producing a number of three-dimensional objects by means of an additive layer-wise building device according to claim 15, an additive layer-wise building device according to claim 16 and a computer program according to claim 17. Further developments of the invention are given in the dependent claims.

According to the invention, a method for providing control commands for producing a number of three-dimensional objects by means of an additive layer-wise building device, wherein the number of objects is produced layer by layer on a building base in the additive layer-wise building device by applying each time a layer of a shapeless building material on the building base or an already existing layer of building material and solidifying said layer at positions that correspond to the cross-section of an object by supplying energy radiation or a binder at these positions, has at least the following steps:

- a step of providing a computer-based model of the number of objects, which model geometrically describes the objects,
- a step of modifying the computer-based model such that for the geometric description of the number of objects a location is defined as a common reference location, in particular as a common origin of coordinates,
- a step of generating control commands for a set of control commands for controlling the production of the number of objects by means of the additive layer-wise building device on the basis of the modified computer-based model.

Normally, the computer-based model of the number of objects to be produced by means of the additive layer-wise building device is a model created by means of a CAD design system, in which a zero point (coordinate origin) is defined for each of the number of objects. According to the invention, for example, a common zero point is defined for the number of objects in the CAD coordinate system and said common zero point is then assigned to a specific location that is specified by build area coordinates in the build area. In this way, a user can arrange individual zero points (reference points for positioning) in the build area of the additive layer-wise building device. This allows the geometric data of objects to be sintered to be precisely positioned at defined locations and the relative position of the geometric data with respect to the zero point in the CAD system can be adopted. According to the invention, a common reference location, in particular as a common coordinate origin, is assigned to a number of objects. By providing such a common reference point for the geometric description of the number of objects a relationship is established between the individual objects, which makes it possible to match changes of the geometric descriptions of the individual objects.

Preferred further developments and embodiments of the invention are given below and in the dependent claims of the method according to the invention. Within the scope of the invention, each feature mentioned below in connection with a claim category (method, control command generation unit, device and computer program) can also be applied to any other claim category.

Preferably, the common reference location is a location in the build area or a location with a fixedly predetermined position relative to the building base. The building base is a support that is arranged in an additive layer-wise building device, generally in a build chamber, and is movable vertically to the layers, or a plate or building platform arranged on said support. In particular, said location with a fixedly predetermined position relative to the building base can be a location in the build area of the additive layer-wise building device, that is to say a location in that horizontal plane through the build chamber in which solidification of the building material takes place. The reference location thus also serves to locally precisely allocate the number of objects to a "building location" in the build area.

Preferably the arrangement takes place based on a coordinate system which represents a geometry of the build area, wherein the reference location is assigned to a defined location in the coordinate system. The coordinate system can, for example, be designed as a uniform grid.

Preferably, in the method according to the invention, in the step of modifying the computer-based model the computer-based model is additionally converted into a modified computer-based model by a rotation and/or a central dilation with respect to a common transformation reference point for the number of objects.

By means of said dilation of the computer-based model in order to obtain a modified computer-based model, dimensional changes of objects caused by the building process can be countered. In general, not only rotations and dilations are possible but also central affine transformations with a fixed point, preferably similarity transformations, which leave ratios of distances to one another and angular quantities unchanged, as long as they are not identical transformations without modification, that is to say mappings of the computer-based model onto itself. It is also to be noted that a scaling (i.e. central dilation) of three-dimensional objects prior to their production is often used on grounds of compensating for the shrinkage that is to be expected in the respective layer-wise building process. Shrinkage and scaling are thus factors of the dimensions of the three-dimensional object which substantially cancel each other as exactly as possible, i.e. the central dilation compensates for the anticipated shrinkage already in advance. By selecting a common transformation reference point for the number of objects it is possible to shrink and rotate all objects within the number of objects with respect to a common reference point. This results in a common calculation of shrinkage as well as the same translation, rotation and the same shrinkage for the entire number of objects.

Preferably, the method can be applied to cases in which a semi-finished part is arranged on the building base, which semi-finished part is completed by producing the number of objects on said semi-finished part. A common transformation reference point for the number of objects and the semi-finished part is then taken as the basis for the rotation and/or central dilation. By selecting a common transformation reference point, a displacement of the objects with respect to the semi-finished part resulting from the transformation (rotation or central dilation) is avoided. It should also be emphasized that it is, of course, also possible to select different transformation reference points for different transformations.

Preferably, the transformation reference point is a geometric center in the computer-based model, in particular a symmetry point or a center of gravity. By the use of a geometric center it is possible, in the case of a transformation, such as a central dilation, to minimize distortions in the geometric description of the number of objects.

In particular, the geometric center can be a center defined by means of one or more bounding volumes (or bounding boxes), in particular minimally surrounding cuboids, surrounding the objects. The bounding volume (bounding box) can also be a three-dimensional structure which is constructed in such a way that a two-dimensional structure surrounding an object cross-section in a selected layer, such as a rectangle which minimally surrounds the cross-section, is enlarged in the direction perpendicular to the cross-section. The geometric center can in particular be the center of a bounding box.

Preferably, the transformation reference point is a point of symmetry or a center of gravity of one of the number of objects or a geometric center of its bounding volume. Thus, at the same time one of the objects is selected as the master object relative to which a transformation of the computer-based model of the remaining objects takes place, which master object is thus defined and used as kind of starting object for the scaling or orientation.

Preferably, the transformation reference point is selected such that it coincides with the common reference location. If both a scaling and a (re-)orientation of the number of objects are to be made, it can be very advantageous if the scaling is based on a first transformation reference point and the orientation is based on a second transformation reference point which is different from the first transformation reference point. In this case, it is further preferred that the orientation based on the second transformation reference point is implemented first and then the scaling is implemented. If, however, the common reference location is selected as a transformation reference point, then the implementation of a transformation is simplified considerably without the building process or the relative size relationship of the objects to one another being strongly impaired.

In a modification of the method according to the invention it is additionally checked whether there are overlaps of objects or overlaps of their bounding volumes in the modified computer-based model. If this is the case, the respective objects are relocated in the model until there is no longer an overlap. Even when implementing a scaling with a common transformation reference point for the number of objects dimensional changes of the objects can cause the objects to collide (overlap) in the modified computer-based model. A warning message can also be initiated and/or an automatic rearrangement of objects in the build area can be carried out if an object overlaps other objects and/or a predefined measuring point in the build area and/or a boundary of the build area. Alternatively or additionally, the warning message can be output to a user who then carries out such a rearrangement self-actingly, but preferably assisted by the algorithm.

Preferably, the invention can be used in connection with additive layer-wise building devices in which a building base is used which is suitable for being removed together with the produced number of objects from the layer-wise building device after completion of the production process and for being introduced into a further processing device for further processing of at least one, preferably all, of the produced number of objects. Also in the further processing device the building base, for example a platform, can serve as a processing base for supporting the objects to be further treated during further processing. In such a case, preferably the reference location and/or the modified model of the objects to be further processed, in which modified model a location is defined as a common reference location, in particular as a common coordinate origin, for the geometric description of the objects to be further processed, is conveyed to the further processing device. Such a downstream further processing can be, for example, milling, spark erosion, grinding, polishing, etc., which is carried out afterwards after completion of the additive layer-wise building process. Since for further processing the same reference location is used as a basis, a calibration of the further processing device can be omitted, in particular if the reference location has a fixedly predetermined position relative to the building base. If, for example, the coordinate origin defined in the CAD coordinate system is assigned to a reference location on the building base for the geometric description of the number of objects, then a milling device that is, for example, used for further processing of objects, in which milling device the building base is used along with the objects, can continue to refer to the same geometric description of the objects as the additive layer-wise building device without a complicated adjustment process. This makes further processing considerably simpler, faster and, above all, more accurate.

If the invention is used in connection with additive layer-wise building processes in which a semi-finished part is used as the building base which semi-finished part is completed by producing the number of objects on said semi-finished part, then in this case preferably the same location can be selected as reference location that was selected as a reference location in a previous building process for the semi-finished part. If such a reference location is adopted from a previous building process, then this is very advantageous because then in both building processes (previous process and additive layer-wise building process) the same location information (reference locations) in the sense of a common coordinate system or system of orientation can be used. Thus, a calibration of the additive layer-wise building device is very simple, if such a calibration is necessary at all, and the additive layer-wise building process can be implemented more easily, more quickly and, above all, more accurately.

Particularly preferably, the method according to the invention runs fully automatically, that is without a necessary input from a user. This leads to an acceleration and simplification of the additive layer-wise building process.

According to the invention, a device for providing control commands for the production of a number of three-dimensional objects by means of an additive layer-wise building device, wherein the number of objects is produced layer by layer in the additive layer-wise building device by applying each time a layer of a shapeless building material in a building chamber and solidifying said layer at positions that correspond to the cross-section of an object by supplying energy radiation or a binder at said positions, comprises at least:
  a model data access unit configured to access model data of a computer-based model of the number of objects, which model geometrically describes the objects,
  a model modification unit configured to modify the model data of the computer-based model in such a way that for the geometric description of the number of objects a location is defined as a common reference location, in particular as a common coordinate origin,
  a control command generating unit configured to generate control commands for a set of control commands for the production of the number of objects by means of the additive layer-wise building device based on the modified computer-based model.

The model data access unit can be an input interface that can read data from a mobile data medium or accept data via a network or read data directly from a database. Since the device for providing control commands can be implemented in particular not only as a separate unit but can also form part of a more comprehensive computer system (e.g. of a CAD design system or of an object property simulation system) or of an additive layer-wise building device, the model data access unit can also be merely a software interface that communicates with the other system components. The network can be a LAN or the Internet by which the data can also be transmitted to a layer-wise building device that is spatially remote from the device for providing control commands. In particular if the device for providing control commands is integrated in an additive layer-wise building device, data transfer via a bus system or a shared memory is also possible.

In a preferred embodiment of the device for providing control commands according to the invention the model modification unit (102) is configured to additionally transfer the computer-based model into a modified computer-based model by rotation and/or central dilation with respect to a common transformation reference point for the number of objects.

After providing control commands according to the invention, according to the invention an additive layer-wise building device can be controlled by said control commands in order to produce the object. Alternatively, an inventive device for providing control commands is already integrated into an additive layer-wise building device.

An additive layer-wise building device according to the invention for producing layer by layer a number of three-dimensional objects from a shapeless building material by solidifying the building material at positions corresponding to the cross-section of an object in a layer by supplying energy radiation or a binder at these locations comprises:
  a building base for supporting the object to be formed;
  an application device for applying a layer of the building material to the surface of the building base or an already existing layer,
  a solidification device which emits energy radiation or ejects a binder and is capable of supplying the energy radiation or the binder to all positions to be solidified in a layer in such a way that the building material is present as a solid body at these positions after the action of the energy radiation or the binder, and
  a control device which controls the application device and the solidification device in such a way that an application step and a solidification step are repeated successively until all the cross-sections of the at least one three-dimensional object to be produced are solidified, wherein the control device is designed such that it executes a method for providing control commands according to the invention.

According to the invention, in a method for producing a number of three-dimensional objects by means of an additive layer-wise building device, said additive layer-wise building device is controlled by a set of control commands which comprises control commands provided by a method according to the invention. In the additive layer-wise building device, the number of objects is produced layer by layer by solidifying a shapeless building material at positions corresponding to the cross-section of an object in a layer by supplying energy radiation or a binder at these positions, wherein the method comprises at least the following steps:
  an application step of providing a layer of a shapeless building material on a building base or an already existing layer of the building material,
  a solidification step of solidifying the applied layer, in which step the energy radiation or the binder acts upon positions to be solidified in the layer in such a way that the building material is present as a solid body after said action of the radiation or binder,
  wherein the application step and the solidification step are repeated successively until all cross-sections of the at least one three-dimensional object to be produced are solidified.

A computer program according to the invention can be loaded into a programmable control device of an additive layer-wise building device and/or a data processing device and comprises program code means for executing all steps of an inventive method for providing control commands and/or an additive layer-wise building method according to the invention when the computer program is executed on the control device and/or on the data processing device.

The control command generating unit comprises at least
a) a provisioning unit, such as an input interface for providing a computer-based model of the number of three-dimensional objects—the provisioning unit is thus configured to implement the above-mentioned first step of the method according to the invention;
b) a determination unit which, upon operation, determines a reference location with respect to at least one of the three-dimensional objects—the determination unit is thus configured to implement the above-mentioned second step of the method according to the invention;
c) a deducing unit, designed for automatically deducing the control commands using the reference location—the deducing unit is thus configured to implement the above-mentioned third step of the method according to the invention.

Furthermore, the invention also relates to a device for implementing an additive layer-wise building method for producing a number of three-dimensional objects. Said device comprises for additively producing layer by layer a number of three-dimensional objects in addition to at least one building means a control command generating unit according to the invention or a data link to such a control command generating unit. All those in particular mechanical and/or optical devices that find a use in a layer-wise building method, such as selective laser sintering or similar well-known layer-wise building methods, are referred to as building means, for example application devices for building materials, lasers or other sources of radiation or particles for target-orientedly directing energy to specific positions of the building material, optical elements and much more. The device described in DE 195 14 740 C1 with all its essential components can be considered as an exemplary reference for a device for implementing an additive layer-wise building method for producing a number of three-dimensional objects and for building means comprised therein. The disclosure of said document is hereby enclosed by reference as part of the disclosure of the present application.

Furthermore, the invention relates to a computer program comprising a sequence of commands by means of which a control command generation unit and/or a device for implementation of an additive layer-wise building method (i.e. primarily the control command generation unit or the device for implementing an additive layer-wise building method according to the invention, which are mentioned above) is enabled to implement the method according to the invention when the computer program is executed on the control command generation unit and/or on the device for implementation of an additive layer-wise building method.

DETAILED DESCRIPTION OF THE EMBODIMENTS

Figure 1:
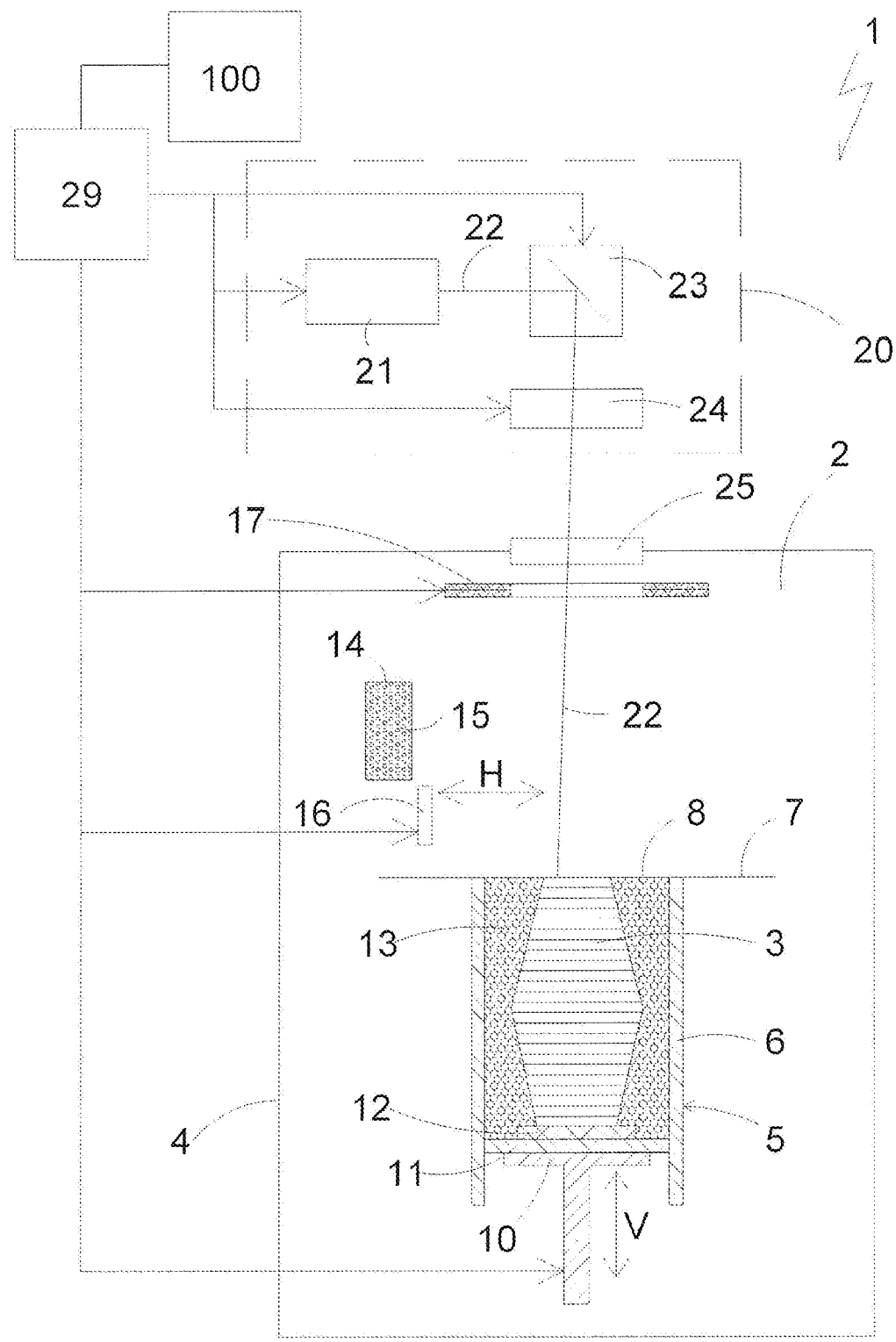
FIG. 1 shows a schematic depiction of an additive layer-wise building device using the example of a laser sintering device.

In connection with the description of the invention it should be noted that the term "zero point" is to be understood synonymously as the term "reference location", which is otherwise used here consistently in the sense of a substantially point-shaped reference location. The term "component" or "part" each stands for a three-dimensional object to be produced. Furthermore, the term "group" is sometimes also used synonymously in place of the term "number". For a description of the method according to the invention, first an additive layer-wise building device according to the invention will be described below with reference to FIG. 1, using the example of a laser sintering or laser melting device.

For building an object 3, the laser sintering or laser melting device 1 comprises a process chamber or building chamber 2 with a chamber wall 4.

A container 5 open to its top with a container wall 6 is arranged in the process chamber 2. A working plane 7 is defined by the upper opening of the container 5, wherein the area of the working plane 7 located within the opening, which can be used for building the object 3, is referred to as build area 8.

In the container 5 a carrier 10 is arranged that can be moved in a vertical direction V and to which a base plate 11 is attached which seals the container 5 at the bottom and thus forms the bottom thereof. The base plate 11 can be formed as a plate separately from the carrier 10 which plate is fixed to the carrier 10, or it can be integrally formed with the carrier 10. Depending on the powder and process used, a building platform 12 can also be arranged on the base plate 11 as a building support, on which the object 3 is built. However, the object 3 can also be built on the base plate 11 itself, which then serves as a building support. In FIG. 1, the object 3 to be formed in the container 5 on the building platform 12 is shown below the working plane 7 in an intermediate state with several solidified layers, surrounded by building material 13 that remained unsolidified.

The laser sintering device 1 further comprises a storage container 14 for a building material 15 in powder form which can be solidified through electromagnetic radiation and an application device 16 which is movable in a horizontal direction H for applying the building material 15 within the build area 8. Optionally, a radiant heater 17 is arranged in the process chamber 2, which serves for heating the applied building material 15. As a radiant heater 17 an infrared heater can be provided, for example.

The laser sintering device 1 further comprises an exposure device 20 with a laser 21 which produces a laser beam 22 which is deflected by a deflection device 23 and focused upon the working plane 7 by way of a focusing device 24 through a coupling window 25 which is arranged on the upper side of the processing chamber 2 in the chamber wall 4.

Furthermore, the laser sintering device 1 comprises a control device 29 by which the individual components of the device 1 can be controlled in a coordinated manner in order to implement the building process. Alternatively, the control unit can also be partially or completely arranged outside of the device. The control unit can comprise a CPU, the operation of which is controlled by a computer program (software). The computer program can be stored separately from the device on a storage medium from which it can be loaded into the device, in particular into the control unit.

The control device 29 is controlled by means of a set of control commands which comprises, among other things, data that contain the structure of the number of objects to be produced, in particular a three-dimensional CAD layer model of the objects with information on the respective cross-section of an object in each layer of the building material to be solidified, and data defining the precise parameters when the building material is solidified. In particular, the data contains accurate information on each layer to be solidified in the production of the number of objects.

During operation, by means of the control device 29, the carrier 10 is lowered layer by layer, the application device 16 is actuated so as to apply a new powder layer and the deflection device 23 and, if appropriate, also the laser 21 and/or the focusing device 24 are actuated so as to solidify the respective layer at positions corresponding to the respective object by means of the laser beam 22 in the build area 8.

Any powder or powder mixtures suitable for the laser sintering or laser melting process can be used as a building material in powder form. Such powders include, for example, plastic powders such as polyamide or polystyrene, PAEK (polyaryl ether ketones), elastomers, such as PEBA (polyether block amides), plastic-coated sand, ceramic powders or metal powders, such as stainless steel powder or other metal powders adapted to the particular purpose, in particular alloys.

The additive layer-wise building device according to the invention additionally contains a device for providing control commands 100, which device is described further below. Said device for providing control commands 100 supplies control commands to the control device 29, which control commands are taken as a basis by the control device 29 during the implementation of the production process of an object.

In addition to laser sintering, the additive layer-wise building methods covered by the invention also include the laser melting method, masking methods in which masks are used for selectively solidifying a material layer, 3D printing methods, stereolithography methods, etc. If the method is not a laser sintering or melting method, the additive layer-wise building device described above as an example obviously has another structure known from the prior art. Likewise, an additive layer-wise building device according to the invention for a laser sintering or melting process also comprises device-based modifications compared to the example described above, provided that a device for providing control commands 100 as described below is provided, which device may also form part of the control device 29. In addition to at least one building means for additively producing three-dimensional objects layer by layer, the invention comprises a control command generating unit according to the invention or a data link to such a control command generating unit. All those in particular mechanical and/or optical devices that find a use in a layer-wise building method, e.g. selective laser sintering or similar well-known layer-wise building methods, are referred to as building means, for example application devices for building materials, lasers or other sources of radiation or particles for target-orientedly directing energy to specific positions of the building material, optical elements and much more. The device described in DE 195 14 740 C1 with all its essential components can be considered as an exemplary reference for a device for implementing an additive layer-wise building method for producing a number of three-dimensional objects and for building means comprised therein. The disclosure of said document is hereby enclosed by reference as part of the disclosure of the present application.

------------------------hier weiter----------------------------------

In an additive production method, in which objects are produced layer by layer from a building material, initially a computer-aided model (CAD model) of the object to be produced is present. A set of control commands for the control device 29 provides the control device 29 with specific information on how the solidification is to be carried out for each point in a layer to be selectively solidified with reference to the computer-aided model (CAD model) of the object to be produced. In the case of a laser sintering or melting method this comprises, for example, information on the intensity of the laser, the beam diameter of the laser, the chronological order in which the individual points of the layer are solidified, any displacement of the laser beam at the contour of a layer's region to be solidified (beam offset) etc.

First Embodiment

Figure 2:
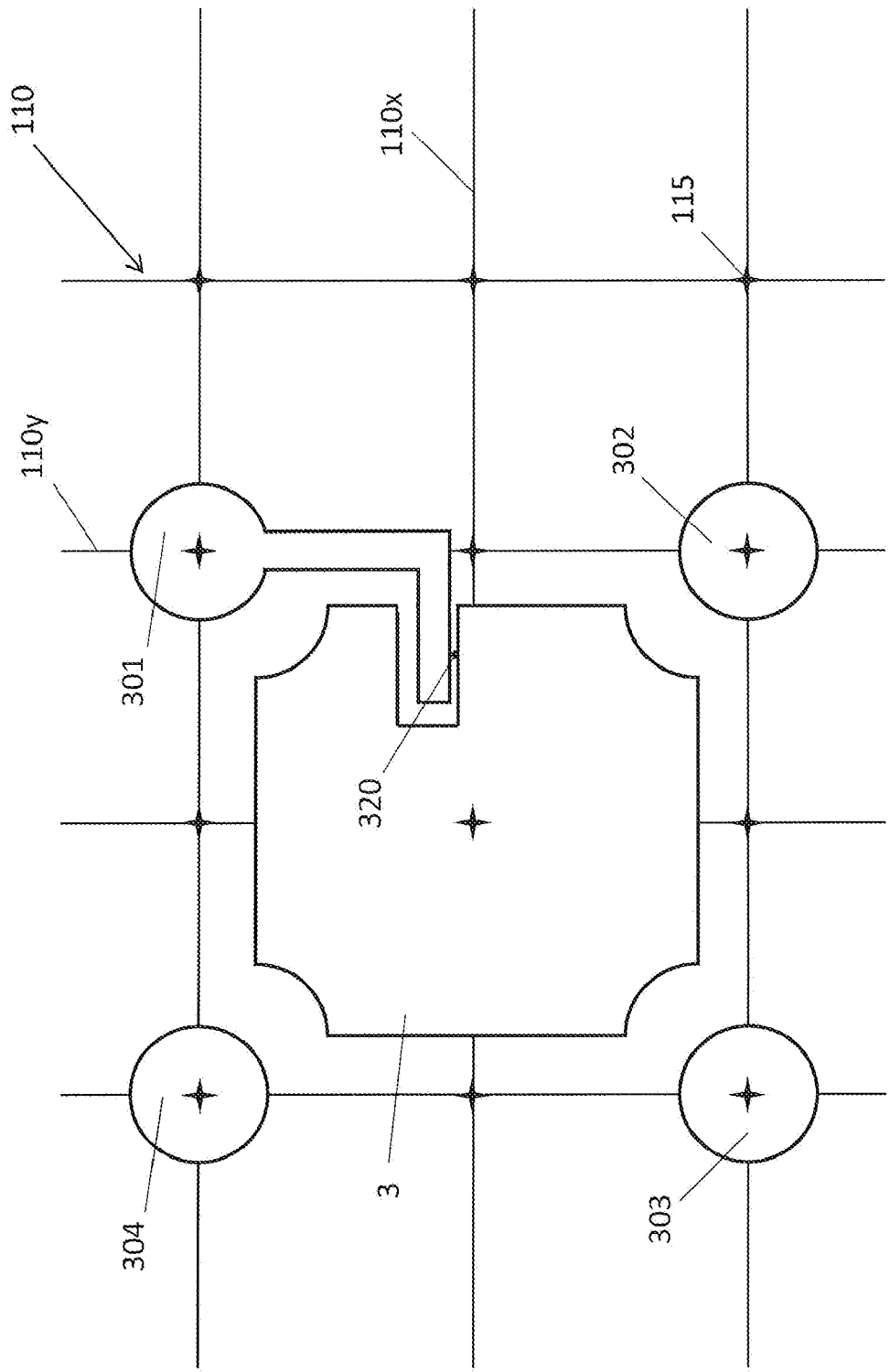
FIG. 2 shows a schematic top view of a portion of a build area of an additive layer-wise building device for illustration of a first embodiment of the method according to the invention.
Figure 3:
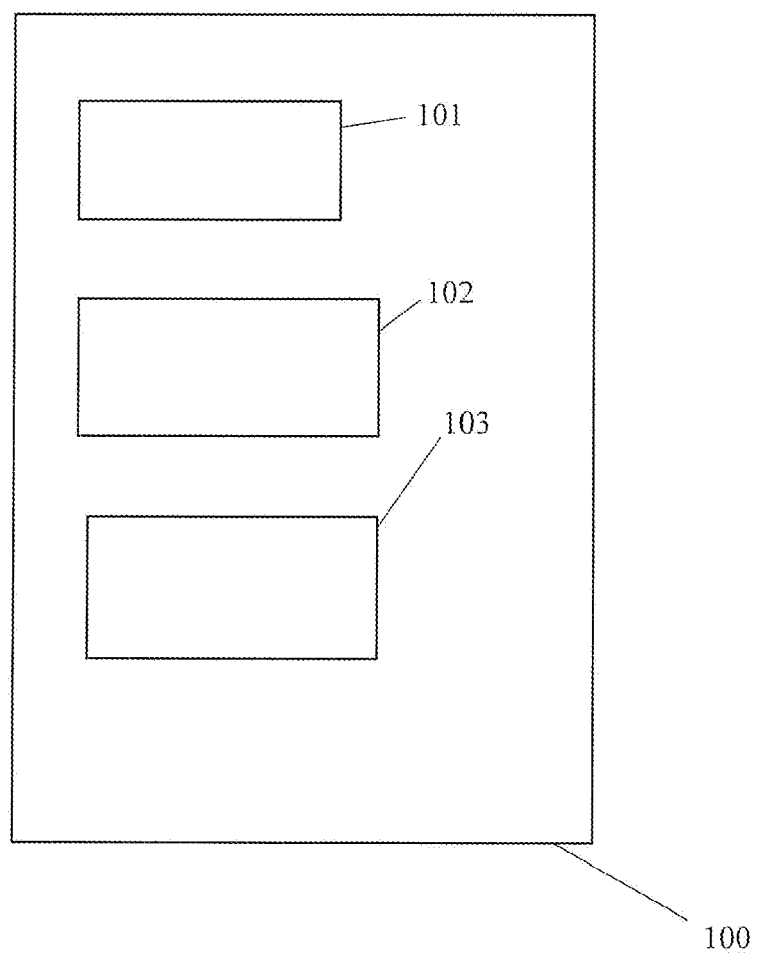
FIG. 3 shows the structure of an embodiment of a device according to the invention for providing control commands.

A first embodiment of the invention is described below with reference to FIGS. 2 and 3. FIG. 2 shows a top view upon a portion of a build area of an additive layer-wise building device during the additive production of a number of objects 3, 301, 302, 303 and 304 (in this example 5 objects).

To produce the objects, a control device 29 of the additive layer-wise building device is controlled by means of a set of control commands that contains, among other things, a three-dimensional CAD layer model of the objects with information on the respective cross-section of an object in each layer of the building material to be solidified and data defining the exact parameters when the building material is solidified. Such a set of control commands is obtained on the basis of a computer-based model of the number of objects, which model is created, for example, by means of a CAD software. In order to obtain the set of control commands, control commands are provided by a device for providing control commands 100, which device is shown schematically in FIG. 3. Such a device for providing control commands 100 can be a correspondingly programmed computer or, however, the device can be realized by means of a software which runs, for example, on the CAD design computer for the number of objects or on the control device 29.

The device for providing control commands 100 includes a model data access unit 101 by means of which the computer-based model of the number of objects 3, 301, 302, 303 and 304 is accessed. The model data access unit is, for example, a software or hardware interface by means of which access to the model data stored in the memory of a CAD design computer (possibly via a network) is possible. Just as well, the model data access unit 101 can be a reading device that reads the model data stored on a portable data medium.

The model data access unit 101 supplies the model modification unit 102 with the model data, which model modification unit proceeds as follows in the modification of the model data:

First, the model data of the entire number of objects 3, 301, 302, 303 and 304 are linked to a common reference location in the build area. Thus, a geometric description of the model data of the objects in the coordinate system of the build area is provided. In particular when a raster arrangement of the objects in the build area is used, as FIG. 2 shows, the transition to build area coordinates is advantageous since then, in the modified computer model, the objects are assigned to fixedly defined positions in the build area with respect to each other by means of the predetermined grid spacing. In the example, the procedure is as follows:

In the build area coordinates, a grid 110 consisting (in FIG. 2) of horizontal lines 110x and vertical lines 110y is generated. Each intersection of a horizontal line 110 x with a vertical line 110y is assigned a grid point 115 which is a potential arrangement location for an object.

In the example, each of the objects 3, 301, 302, 303 and 304 is placed on such a grid point 115 in the build area (e.g. by assigning to the entire number of objects that grid point as a common reference point at which the object 3 is placed and by defining the distances of the objects relative to one another in the build area coordinate system so that each of the objects 301, 302, 303 and 304 is located on a grid point). Herein, the term "arranging (or placing) on a grid point" means that the zero point of the CAD model of a component in object coordinates is assigned to the build area coordinates of a grid point 115.

It is to be noted that, of course, an arrangement grid can also be omitted or a different geometry of the grid (not necessarily a square grid) can be chosen, as long as the number of objects is assigned a common reference location.

If a platform is used as a building base, which platform can also be used in other processing devices than the additive layer-wise building device, the particular advantage of the use of build area coordinates is demonstrated: If an arrangement of the platform at zero clearance is provided in the respective devices (e.g. by means of a clamping system that is commercially available), then in the individual devices (for example a milling device in which the produced objects are post-processed or a device in which semi-finished parts are produced which are then completed by means of the additive layer-wise building device) separate adjustment procedures do not need to be carried out. As a result of the possibility of arranging the platform at zero clearance in the respective processing devices, there is a fixed relationship between a device coordinate system and the platform coordinates. It is then sufficient to specify the processing operations with reference to the platform coordinates without carrying out a complex adjustment process.

The reference location can optionally be defined on the basis of an at least partially automatic definition algorithm. Such a definition algorithm preferably defines the reference location on the basis of a criteria database. Further preferably, at least one of the following criteria is stored in the criteria database:
  collision criterion which initiates a warning message when an object overlaps with other objects and/or with a predetermined measuring point in the build area and/or with a boundary of the build area, on the basis of which warning message preferably an automatic rearrangement of objects in the build area is carried out,
  a component-specific criterion that queries component-specific arrangement requirements for an arrangement of the component in the build area and optimizes the arrangement of the component accordingly,
  a material-specific criterion that takes into account specific properties of a building material for the determination of the reference location,
  a raster criterion which automatically sets the reference location at a point grid stored in the raster criterion.

According to one aspect of the invention, the reference location can also be defined at least partially user-defined on the basis of an input from a user. For example, the model modification unit 102 can optionally output a warning message to a user when an object overlaps with other objects and/or with a predetermined measuring point in the build area and/or with a boundary of the build area, which user then himself, however preferably based on an algorithm again, carries out a rearrangement of the object or objects. Furthermore, the model modification unit 102 can optionally automatically set the reference location at a point in the point grid that is closest to a location defined by the user—this may be understood as a kind of "latching function", i.e. an automatic shifting, based on a raster, of the object towards points of the grid specified by a user. For this purpose, for example, an input option for the user can be provided, for example a table with the coordinates of the selectable grid points, which table makes it possible to freely place a part on one of these points. This is then done via a catch function.

To compensate for dimensional changes of the objects as compared to the original CAD model, which dimensional changes can be caused by the additive layer-wise building process, the model modification unit 102 subjects the original CAD model of the number of objects to a scaling (central dilation). In particular, a common transformation reference point (fixed point of the central dilation) is selected for all objects. The reason is that the distances between the objects also change by the central dilation and said changes in distance are different for different positions of the transformation reference point. On the one hand, changes in distance can have the disadvantageous effect that, after scaling, objects overlap one another, that is, they are no longer separate from each other. On the other hand, the objects can move away from their grid points as a result of the distance changes. In particular in the case of a platform which is likewise used in a post-processing device after the additive production, this leads to complex readjustment processes in the post-processing device.

The choice of a suitable common transformation reference point generally depends on the geometry (in particular the symmetry) of the objects or on their arrangement. In the example of FIG. 2, the grid point 115 on which the central object 3 is placed would be a suitable transformation reference point for scaling. On the one hand, the distances of the objects 301, 302, 303 and 304 to the central object 3 change in the same way. If, however, an overlap is to be avoided right at the position where the objects 3 and 301 interleave, the point 320 could also be selected as the transformation reference point.

The transformation reference point can be defined at least partially user-defined on the basis of an input from a user. Likewise, the reference location can be determined automatically or semi-automatically on the basis of at least one determination algorithm. In this case, it is then preferred that the determination algorithm defines the reference location on the basis of a criteria database in which at least one of the following criteria is stored:
  a central location criterion which determines from the computer-based model of at least one three-dimensional object a central location which is preferably selected from a central point, a center of gravity, a central line point of a line representing the object, in each case with respect to the object and/or to a specific (selected) layer thereof, which layer underlies the layer-wise building method;

a contour criterion which determines a contour from the computer-based model of at least one three-dimensional object with respect to the object and/or to a specific (selected) layer thereof, which layer underlies the layer-wise building method;

a function criterion which assigns a particular function to a location and/or to a functional region of the object. Such a function can, for example, result from the shape of the location or the functional region, but also from its position with respect to the three-dimensional object to be produced or with respect to other objects to be produced. For example, a recess in a functional region of the component can assume a fixing function from which, for example, it can be deduced that the recess has to be positioned very precisely in the additive production and should also remain essentially fixed in place during a scaling of the object. Also from other locations or functional regions such requirements for stationarity can be derived.

For an automatic determination of a transformation reference point, it can be advantageous not to take the true shape of an object as a basis when determining a central location or geometric center of an object, but rather the shape and position of a bounding volume surrounding the object, in particular of a cuboid that is assigned to the object and minimally surrounds the object (in other words, the shape and location of its bounding box). In certain circumstances it can also be advantageous to use the bounding volume surrounding a plurality of objects as a basis for determining a central location or geometric center.

As can be seen from the example of FIG. 2, it can also be advantageous to select a master part (object 3 in FIG. 2) from the number of objects and to determine a transformation reference point and/or the reference location such that only the properties of the master part are considered (i.e. its symmetry, etc.).

Finally, the control command generating unit 103 generates control commands for a set of control commands for the production of the number of objects by means of the additive layer-wise building device based on the computer-based model modified by the model modification unit 102. The control commands can either be integrated into a set of control commands by the device for providing control commands itself, or said last step is implemented in a separate device, such as the control device 29.

The number of objects can be a related group of objects to be produced or else the total number of objects to be produced by the additive layer-wise building device in a building process.

Second Embodiment

Figure 4:
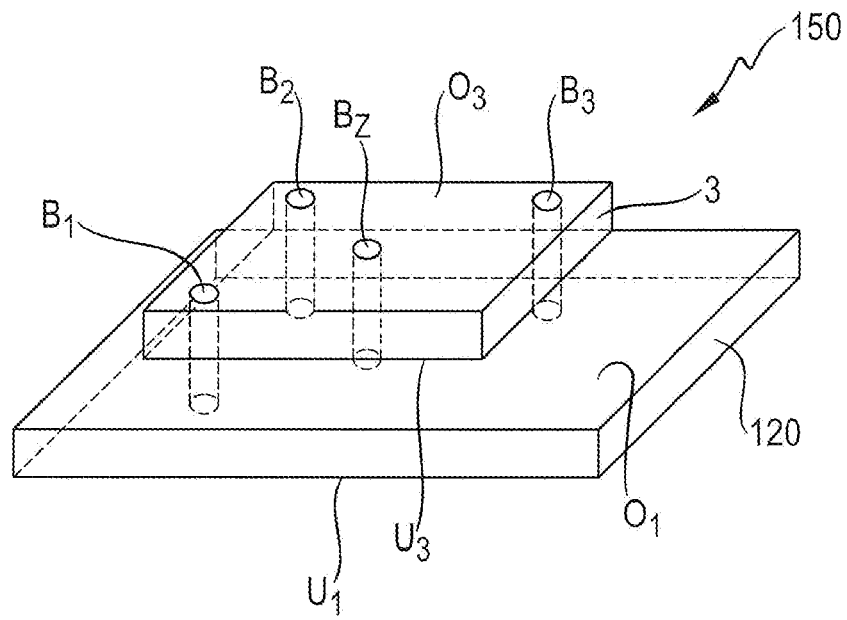
FIG. 4 shows a schematic perspective view of a model of a three-dimensional object to be produced on a support for the production according to a second embodiment of the method according to the invention.
Figure 5:
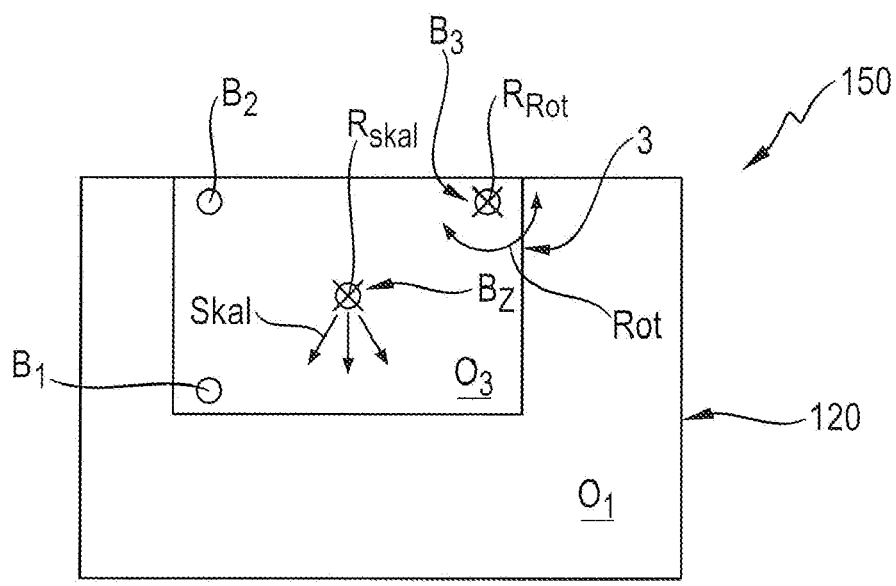
FIG. 5 is a top view of the model of FIG. 4.

A second embodiment of the invention is described below with reference to FIGS. 4 and 5. FIGS. 4 and 5 show a model (e.g. present in the form of a CAD file) of a component 3, i.e. of a three-dimensional object 3 to be produced, which is to be produced on a semi-finished part, a so-called preform 120, arranged on a base, by means of an additive layer-wise building method, such as direct metal laser sintering. The preform 120 is a component produced in a production process preceding the additive layer-wise building process, for example a CNC milling component or the like. Such preforms are used, for example, in the production of tools and serve as semi-finished parts in each case as the basis for a hybrid component, the inner and outer outlines and functions of which are substantially shaped by the post-processing in the additive layer-wise building process.

The component 3 is to be built on this preform 120 so that the entire production process comprises a hybrid production process from which a hybrid component 150 consisting of the preform 120 and the component 3, which are firmly connected to one another by the additive layer-wise building process, is formed. Here, the preform 120 is exemplarily designed as a rectangular uniformly high part and has a top side $O_1$ and a bottom side $U_1$. Here, the component 3 itself is also designed rectangular and uniformly high and has a top side $O_3$ and a bottom side $U_3$. Four recesses in the shape of bores are already provided in the preform 120. They correspond in their shape and arrangement with analog recesses in the component 3 that extend the bores in the preform in an upward direction so that they add up to form recesses $B_1$, $B_2$, $B_3$, $B_z$. The recesses $B_1$, $B_2$, $B_3$, $B_z$ thus extend from the top side $O_3$ to the bottom side $U_3$ of the component 3 and further directly continue from the top side $O_1$ to the bottom side $U_1$ of the preform 120. The three recesses $B_1$, $B_2$, $B_3$ are each positioned in a region of corners of the component 3; the recess $B_z$ on the contrary is a central recess in the center of the component 3.

Within the scope of the invention, the CAD model of the component 3 is first modified such that a location in a build area of the additive layer-wise building device (not shown), at which location the component 3 is to be produced additively or the preform 120 is to be placed, is a reference location for the geometrical description of the component 3. A location on the preform 120 is preferably selected as a reference location, whereby the geometrical description of the component 3 is linked with positions on the surface of the preform 120. Preferably, the preform 120 is further placed at a pre-defined location on the building base, thereby linking a predefined location at the preform 120 to the predefined location at the building base so as to provide a common coordinate system for describing locations on the preform 120 and locations on the building base.

Next, transformation reference points are determined in the build area for the scaling (central dilation) of the data of component 3 and a rotation of component 3 and of preform 120. It can be seen from FIG. 5 that in the present example there are two different transformation reference points $R_{rot}$ and $R_{skal}$, wherein the first transformation reference point $R_{skal}$ is used for scaling the component 3 larger, for example, for the purpose of shrinkage compensation. Thus, all scaling arrows Skal point in a radial direction away from the first transformation reference point $R_{skal}$, which is exactly positioned (i.e. defined to be) in the center of the central recess $B_z$. Thus, one can ensure that the shrinkage compensation is implemented uniformly along each line or line segment from the central recess $B_z$ in the direction to the outer boundary of the component 3. Eventually, this results in a shrinkage compensation which is true to scale with respect to the preform 120. As a result, it can eventually be assured that, after carrying out the additive layer-wise building process, the continuous linear (i.e. generally: envisaged) course of all the recesses $B_1$, $B_2$, $B_3$, $B_z$ from the bottom side $U_1$ to the top side $O_3$ is ensured. If, however, a scaling was implemented using another transformation reference point than the one shown here, displacements of the recesses in the component 3 relative to those in the preform 120 were bound to occur. The choice of the transformation reference point $R_{skal}$ provided for scaling essentially depends on the component, that is, it depends on the respective geometry of the object and/or on an allocation to other parts corresponding with the object, such as in this case the preform 120.

However; the second transformation reference point $R_{rot}$ which is arranged at the center of the third recess $B_3$ serves as the center of a rotation of component 3 and preform 120 in the build area along a direction of rotation Rot with the purpose of orienting the component and the preform accordingly in the additive layer-wise building.

Preferably, the component is first oriented, i.e. it is rotated along a rotation direction Rot along a rotational axis that is defined by the transformation reference point $R_{rot}$ and, in this case, extends perpendicular into the figure, and then it is scaled as described above.

It would also be possible to select a common transformation reference point for the scaling and the rotation which would then be a fixed point for the ultimately implemented combined rotation and dilation. It is important that the transformation reference point for the dilation is a point which would likewise be chosen for a dilation of the preform 120 due to the same symmetry properties of preform 120 and component 3 (in this case in particular the position of the mutually interacting (corresponding) sections of component 3 and preform 120, i.e. in the present example the position of the recesses (bores) $B_1$, $B_2$, $B_3$ at the corners). In particular, the reference location in the build area can also be identical to a transformation reference point, as a result of which the determination of the modified CAD model of the component 3 (i.e. the CAD model after its scaling and/or rotation) is simplified.

With reference to FIGS. 4 and 5 an embodiment with a preform 120 was described. Such a hybrid method need not necessarily be carried out; it also occurs that components are built which are supported by so-called supports, i.e. by a building structure, that is located below the actual component during the additive layer-wise building process (i.e. between the component and a support of the build area (such as a building platform)) and which building structure serves as a supporting structure of the component during the building process. In this case, the supports can be considered as belonging to the number of objects described in the first embodiment and the procedure is as described in the first embodiment except that an object and the associated support are possibly assigned to the same grid point 115 in the build area.

Furthermore, all possible modification described in connection with the first embodiment can also be applied in the same way in the second embodiment. In particular, a plurality of objects can be produced on a preform 120, too.

It is emphasized once again that the embodiments described here can either stand alone or can be combined with one another at will. The term "a/an" generally includes as an option also "more than one", unless it is explicitly identifiably specified as "single" or "exactly one". A unit can also comprise a plurality of subunits, which can also be provided spatially separated from one another. The term "number" is understood to mean "one or more"; the term "plurality" is understood to mean "more than one".

Finally, it should be mentioned that the individual components 101 to 103 of the device for providing control commands can either be implemented by means of hardware or can be present as pure software modules or as mixtures of hardware and software. In particular interfaces need not necessarily be designed as hardware components but can also be implemented as software modules, e.g. if the data that is entered or output via said interfaces can be taken over from another component that is already implemented on the same device or when said data needs only to be transferred to another component by means of software. Likewise, the interfaces can consist of hardware and software components, such as a standard hardware interface that is specifically configured by software for the specific application. In addition, a plurality of interfaces can also be combined in a common interface, for example an input-output interface.

The invention claimed is:

1. A computer-implemented method of modifying a computer-based model of a plurality of three-dimensional objects to be produced by means of an additive layer-wise building device, wherein the number of objects are produced layer by layer on a build area in the additive layer-wise building device by applying a layer of building material on the build area or an already existing layer of building material and solidifying the layer at positions that correspond to cross-sections of the objects by supplying energy radiation or a binder at these positions, the method comprising at least the following steps:
   providing a computer-based model of the plurality of objects, the model geometrically describing the objects in model object shapes corresponding to the objects;
   modifying the computer-based model by assigning an individual coordinate origin position to each of the plurality of objects as an individual reference point for each of the objects, and a common origin position for the plurality of objects as a collective reference point defining a spatial relationship and distances between the individual coordinate origin positions of the number of objects, the individual coordinate origin positions and the common origin position being specified by building base coordinates defining points in the build area;
   generating control commands for a set of control commands for controlling the production of the number of objects to arrange the number of objects to be built in the build process about the common origin position in a non-overlapping arrangement of built objects; and
   producing the number of three-dimensional objects using the set of control commands by the additive layer-wise building device in the build area.

2. The method according to claim 1, wherein the collective reference location is a location in the build area or a location with a fixedly predetermined position relative to the building base.

3. The method according to claim 1, wherein in the step of modifying the computer-based model the computer-based model is additionally converted into a modified computer-based model by a rotation and/or central dilation with respect to a common transformation reference point for the plurality of objects.

4. The method according to claim 3, wherein a semi-finished part is arranged on the build area, the semi-finished part being completed by producing the number of objects on the semi-finished part and wherein a common transformation reference point for the number of objects and the semi-finished part is taken as the basis for the rotation and/or central dilation.

5. The method according to claim 3, wherein the transformation reference point is a geometric center in the computer-based model.

6. The method according to claim 5, wherein the geometric center is a center defined by of one or more bounding volumes surrounding the objects.

7. The method according to claim 3, wherein the transformation reference point is a point of symmetry or a center of gravity of one of the number of objects.

8. The method according to claim 3, wherein the transformation reference point is selected such that it coincides with the collective reference location.

9. The method according to claim 3, further comprising determining whether there are overlaps of objects or overlaps of bounding volumes of the objects in the modified computer-based model and, if there are overlaps, relocating the respective objects in the model until the overlaps are removed.

10. The method according to claim 1, wherein the building base is configured to be removed together with the number of objects produced from the layer-wise building device after completion of production and further configured to be introduced into a further processing device for further processing of at least one of the number of objects produced by the layer-wise building device, wherein in the further processing device the building base serves as a processing base for supporting the objects to be further treated during further processing; and
    wherein the reference location and/or the modified model of the objects to be further processed is conveyed to the further processing device.

11. The method according to claim 1, further comprising arranging a semi-finished part on the build area, the semi-finished part being completed by producing the number of objects on the semi-finished part, wherein a same location is selected as a reference location that was selected as a reference location in a previous building process for the semi-finished part.

12. The method according to claim 1, wherein the method runs without a necessary input from a user.

13. A method for producing a number of three-dimensional objects by means of an additive layer-wise building device that is controlled by a set of control commands which comprises control commands provided by a method according to claim 1,
    wherein in the additive layer-wise building device, the number of objects is produced layer by layer by solidifying a shapeless building material at positions corresponding to the cross-section of an object in a layer by supplying energy radiation or a binder at these positions, the method comprising at least the following steps:
    an application step of providing a layer of a shapeless building material on a building base or on an already existing layer of the building material,
    a solidification step of solidifying the applied layer, in which step the energy radiation or the binder acts upon positions to be solidified in the layer in such a way that the building material is present as a solid body after said action of the radiation or binder,
    wherein the application step and the solidification step are repeated successively until all cross-sections of the at least one three-dimensional object to be produced are solidified.

14. An additive layer-wise building device for producing, layer by layer, a number of three-dimensional objects from a shapeless building material by solidifying the building material at positions corresponding to the cross-section of an object in a layer by supplying energy radiation or a binder at these locations, wherein the device comprises:
    a building base for supporting the object to be formed;
    an application device for applying a layer of the building material to the surface of the building base or an already existing layer,
    a solidification device which emits energy radiation or ejects a binder and is capable of supplying the energy radiation or the binder to all positions to be solidified in a layer in such a way that the building material is present as a solid body at these positions after the action of the energy radiation or the binder, and
    a control device which controls the application device and the solidification device in such a way that an application step and a solidification step are repeated successively until all the cross-sections of the at least one three-dimensional object to be produced are solidified, wherein the control device is designed such that it executes a method according to claim 1.

15. A non-transitory computer-readable medium storing a computer program executable by a programmable control device and/or a data processing device, the computer program comprising program code means for executing all steps of a method according to claim 1 when the computer program is executed on the control device and/or on the data processing device.

16. An additive layer-wise building device for producing, layer by layer, a number of three-dimensional objects from a shapeless building material by solidifying the building material at positions corresponding to the cross-section of an object in a layer by supplying energy radiation or a binder at these locations, wherein the device comprises:
    a building base for supporting the object to be formed;
    an application device for applying a layer of the building material to the surface of the building base or an already existing layer,
    a solidification device which emits energy radiation or ejects a binder and is capable of supplying the energy radiation or the binder to all positions to be solidified in a layer in such a way that the building material is present as a solid body at these positions after the action of the energy radiation or the binder, and
    a control device which controls the application device and the solidification device in such a way that an application step and a solidification step are repeated successively until all the cross-sections of the at least one three-dimensional object to be produced are solidified, wherein the control device is designed such that it executes a method according to claim 13.

17. A device for manufacturing a plurality of three-dimensional objects to be produced together in a single build process layer by layer by applying a layer of building material in a building chamber and solidifying the layer at positions that correspond to a respective cross-section of an object by supplying energy radiation or a binder at the positions, wherein the device comprises:
    a model data access unit that has model data of a computer-based model of the number of objects, the model geometrically describing the objects in model object shapes corresponding to the objects;
    a model modification unit that is operated to modify the model data of the computer-based model by assigning an individual coordinate origin position to each of the number of objects as an individual reference point for each of the number of objects, and a common origin position for the number of objects as a collective reference point defining a spatial relationship and distances between individual coordinate origin positions of the number of objects, the individual coordinate origin positions and the common origin position being specified by building base coordinates defining points in the build area;
    a control command generating unit providing a set of control commands for the production of the number of objects using the model modification unit to collectively organize model object shapes by arranging the number of objects to be built in a build process about the common origin position in a non-overlapping arrangement of built objects; and an additive layer-wise building apparatus configured to produce the number of objects using the set of control commands in the build area.

18. The device according to claim 17, wherein the model modification unit is configured to additionally transfer the computer-based model into a modified computer-based model by a rotation and/or central dilation with respect to a common transformation reference point for the plurality of objects.

\* \* \* \* \*